United States Patent
Rowell et al.

(10) Patent No.: US 10,536,228 B2
(45) Date of Patent: Jan. 14, 2020

(54) TEST SYSTEM AND TEST METHOD

(71) Applicant: Rohde & Schwarz GmbH & Co. KG, München (DE)

(72) Inventors: Corbett Rowell, München (DE); Benoit Derat, München (DE)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 0 days.

(21) Appl. No.: 15/868,150

(22) Filed: Jan. 11, 2018

(65) Prior Publication Data
US 2019/0215085 A1 Jul. 11, 2019

(51) Int. Cl.
*H04B 17/29* (2015.01)
*H04B 17/00* (2015.01)
*H04B 17/24* (2015.01)
*H04B 17/15* (2015.01)
*H04B 17/10* (2015.01)

(52) U.S. Cl.
CPC ......... *H04B 17/29* (2015.01); *H04B 17/0085* (2013.01); *H04B 17/101* (2015.01); *H04B 17/15* (2015.01); *H04B 17/24* (2015.01); *H04B 17/102* (2015.01); *H04B 17/103* (2015.01)

(58) Field of Classification Search
CPC .... H04B 17/19; H04B 17/24; H04B 17/0085; H04B 17/15; H04B 17/101; H04B 17/102; H04B 17/103
See application file for complete search history.

(56) References Cited

U.S. PATENT DOCUMENTS

| | | | |
|---|---|---|---|
| 2010/0109932 A1* | 5/2010 | Liu | G01R 29/0864 342/1 |
| 2014/0256373 A1* | 9/2014 | Hernandez | H04B 17/12 455/509 |
| 2014/0368048 A1 | 12/2014 | Leabman et al. | |
| 2015/0357713 A1* | 12/2015 | Griffith | G02B 6/4225 343/720 |
| 2015/0358337 A1* | 12/2015 | Keller | H04W 12/12 726/23 |
| 2016/0322713 A1* | 11/2016 | You | H01Q 1/521 |
| 2017/0031068 A1* | 2/2017 | Crawford | G02B 5/10 |
| 2018/0006745 A1* | 1/2018 | Vanwiggeren | H04B 17/3912 |
| 2018/0149686 A1* | 5/2018 | Qi | G01R 29/08 |

FOREIGN PATENT DOCUMENTS

WO 2014/200857 A1 12/2014

\* cited by examiner

*Primary Examiner* — Syed Haider
(74) *Attorney, Agent, or Firm* — Westman, Champlin & Koehler, P.A.

(57) ABSTRACT

A test system for testing a wireless device under test in a test chamber. The device under test may be located on a bottom of the test chamber, and a measurement antenna may be mounted on a bottom or a side wall of the test chamber. Further, a reflector may be mounted on a ceiling of the test chamber. Accordingly, a signal path for testing the device under test may be established by reflecting the wireless signals between the device under test and the measurement antenna by the reflector.

18 Claims, 2 Drawing Sheets

TEST SYSTEM AND TEST METHOD

TECHNICAL FIELD

The present invention relates to a test system. The present invention further relates to a test method.

BACKGROUND

Although applicable in principal to any wireless test system, the present invention and its underlying problem will be hereinafter described in combination with testing of wireless devices.

The use of wireless communication systems for communication between electronic device increases continually with the advance of high-speed wireless data communications.

During development or production of devices for such communication systems it is necessary to thoroughly test the devices for compliance with communication standards and legal regulations, especially regarding wireless communication standards and legal regulations.

Usually the respective wireless communication devices have to be tested at the end of a production line in order to verify whether the respective devices fulfill desired constrains.

For this purpose, each device has to be placed in a predetermined radio environment. In this predetermined radio environment, disturbances and reflections of radio frequency signal should be avoided to make the testing more reliable.

Against this background, the problem addressed by the present invention is to provide a simple test system for wireless devices.

SUMMARY

The present invention solves this problem by a test system with the features of claim 1 and by a test method with the features of claim 11.

According to a first aspect, a test system for testing a device under test is provided. The device under test is located on a bottom of a test chamber. The test system comprises a measurement antenna and a reflector. The measurement antenna is mounted on the bottom or on a side wall of the test chamber. The measurement antenna may emit outgoing test signals to the device under test. The measurement antenna may also receive incoming test signals emitted by the device under test. The reflector is mounted on a ceiling of the test chamber. The reflector may adapted to collimate the test signals emitted by the measurement antenna in a direction of the device under test. The reflector may be also adapted to focus the test signals emitted by the device under test in a direction of the measurement antenna.

According to a further aspect, a test method for testing a device under test is provided. The device under test is located on a bottom of a test chamber. The test method comprises emitting outgoing test signals to the device under test or receiving incoming test signals emitted by the device under test by a measurement antenna mounted on the bottom or on a side wall of the test chamber. The test method further comprises collimating the test signals emitted by the measurement antenna in a direction of the device under test or focusing the test signals emitted by the device under test in a direction of the measurement antenna by a reflector mounted on a ceiling of the test chamber.

The present invention is based on the fact that measuring and testing radio frequency signals of a wireless device requires uniform and identical conditions for testing each of a plurality of devices under test. In particular, disturbances due to reflections and/or interferences of radio frequency signals may distort the measurement results. This makes it difficult to evaluate the test results.

Thus, the present invention aims to provide an efficient testing of wireless signals which can provide well defined radio frequency conditions. In particular, the present invention provides a test system with a signal path between a measurement antenna and the device under test which does not cause any interferences, e.g. due to reflections on side walls or the like.

It is for this purpose that the present invention uses a reflector mounted on a ceiling of a test chamber for collimating the radio frequency waves of the signals between the device under test and the measurement antenna in such a way that the radio frequency waves between the device under test and the reflector run almost parallel to each other. In this way, it is possible to obtain a well-defined test area on which the device under test can be placed, while the remaining space of the test chamber, in particular the side walls of the test chamber are not covered by the test signals which are emitted by the measurement antenna. In this way, disturbances due to interferences caused by reflections of radio signals on the side walls or the like can be avoided. Accordingly, a well-defined test condition for testing the device under test can be achieved.

In particular, the present invention provides a test system, whereby the device under test can be easily placed on the bottom of a test chamber. This makes it very easy to successively perform a testing of multiple devices under test successively. Due to the location of the device under test on the bottom of the test chamber, a very fast and easy positioning of the device under test can be realized. Thus, the period of time which is necessary for configuring the individual test scenario can be reduced, and consequently, a throughput for testing multiple devices under test can be increased.

To obtain a coverage of a signal path for testing the device under test which covers a device under test located on a bottom of the test chamber, the reflector may be mounted on a ceiling of the test chamber. In particular, the reflector may have a curved shape for adapting the signal path between the device under test and the measurement antenna. In particular, the reflector may, on the one hand side, collimate the radio frequency signal in such a way that the waves of the radio frequency signal propagate almost parallel to each other in the space between the device under test and the reflector. Furthermore, the reflector may focus the signals which are emitted by the device under test on the measurement antenna. In this way, the location of the measurement antenna can be chosen very flexible. For example, the measurement antenna may be located on a side wall of the measurement chamber or on the bottom of the measurement chamber. By adapting the shape of the reflector, in particular the curved reflecting surface of the reflector, it is possible to adapt the signal path between the device under test and the measurement antenna accordingly. For example, the measurement antenna may have a parabolic or a spherical reflecting surface. However, it is understood, that the reflecting surface of the reflector may have any other appropriate shape for forming the signal path between the measurement antenna and the device under test accordingly.

The device under test may be any kind of wireless device, in particular any kind of wireless device emitting radio frequency signals. For example, the device under test may be a mobile phone or a cell phone, a smart phone, etc. Further, the wireless device may be also a base station or the like. Further, the wireless device may be a device of an internet of things. However, it is understood, that the wireless device is not limited to the above-mentioned devices. Furthermore, the wireless device may be any other wireless device emitting radio frequency signals or receiving radio frequency signals.

The test chamber may be any kind of appropriate chamber for testing a device under test. For example, the test chamber may be a shielded chamber or room. The test chamber may be shielded against any external interferences. In particular, the test chamber may be an anechoic chamber. An anechoic chamber may be a measurement chamber which is designed to completely absorb reflections of electromagnetic waves. For example, an inner surface of the anechoic chamber may be covered with radiation absorbent material, RAM. RAM is designed and shaped to absorb radio frequency radiation as efficient as possible. With an anechoic chamber the quality of the measurements of the test system may therefore be increased.

Further embodiments of the present invention are subject of the further sub-claims and of the following description, referring to the drawings.

In a possible embodiment, a signal path of the outgoing test signals and the incoming test signals between the device under test and the reflector is in a vertical direction.

In this context, vertical direction is understood as a direction between the device under test on the bottom and the reflector mounted on the ceiling of the test chamber. By such a signal path having a vertical direction between the device under test and the reflector, a well-defined area on the bottom of the test chamber can be covered for measuring and testing the device under test. In particular, it is possible to obtain a well-defined direction of the test signals and consequently, well-defined test conditions for testing the device under test.

In a possible embodiment, the signal path of the outgoing test signals and the incoming test signals between the device under test and the reflector is orthogonal to the bottom of the test chamber.

By such an orthogonal signal path between the device under test and the reflector, it is possible to have a well-defined direction of the signal path which leads to well-defined test conditions. In particular, by a signal path being orthogonal to the bottom of the test chamber, the device under test on the bottom is covered in a very efficient way. Accordingly, it is possible to easily place the device under test on the appropriate area on the bottom of the test chamber for testing the device under test. In this way, it is possible to very easily arrange the device under test on the respective position. This may lead to a high throughput of multiple devices under test and consequently, to a very efficient and low-cost testing procedure for testing multiple devices under test.

In a possible embodiment, the test system comprises a positioning device for positioning the device under test at a predetermined position in the test chamber. In particular, the positioning device may be located at a predetermined position on the bottom of the test chamber.

The positioning device may be any appropriate device for positioning the device under test in the test chamber. For example, the positioning device may have a fixing device for holding the device under test. The positioning device may further have any appropriate moving device for moving the position of the device under test. For example, the positioning device may move the device under test in longitudinal direction, for instance in a direction parallel to the bottom of the test chamber, or two directions, in particular to orthogonal directions parallel to the bottom. Furthermore, the positioning device may also move the device under test in a direction orthogonal to the bottom of the test chamber. Further, the positioning device may also rotate the device under test along a number of one or more axes.

In a possible embodiment, the test system comprises a conveyor belt for feeding the device under test into the test chamber.

By using a conveyor belt for feeding the device under test into the test chamber, and removing the device under test from the test chamber after performing the test, a very efficient test of multiple devices under test can be performed. For example, the device under test may be put on the conveyor belt outside the test chamber. Successively, the conveyor belt may move the device under test into the test chamber and arrange the device under test at a predetermined position in the test chamber. After performing the test of the device under test in the test chamber, the conveyor belt may further move the device under test outside the test chamber. When successively testing multiple devices under test, it may be possible to arrange a number of devices under test on the conveyor belt, for instance at predetermined distances between each device under test, and moving the devices under test through the test chamber by using the conveyor belt. In particular, each time a device under test is located at a predetermined position inside the test chamber, the conveyor belt may be stopped and a test of the respective device under test may be performed.

In a possible embodiment, the test system comprises a shielded test chamber, in particular a shielded test chamber having a ceiling, a bottom and a number of side walls. For example, a test chamber may comprise four orthogonal side walls. However, it is understood, that any other configuration of a shielded test chamber may be possible, too. For example, the side walls may have a cylindrical shape. Any other configuration of a test chamber having a ceiling and a bottom may be possible, too.

In a possible embodiment, the test chamber may comprise a number of one or more closeable doors. In particular, the closeable doors may be used for feeding the device under test into the test chamber. For example, the test chamber may comprise one door which may be opened for feeding a device under test into the test chamber. After the device under test is arranged at the desired position in the test chamber, the door may be closed and successively, the respective test of the device under text may be performed. After finishing the test of the device under test, the door may be opened again for removing the device under test. Successively, a further device under test may be put into the test chamber. Alternatively, it may be also possible that the test chamber may comprise two doors. In this case, the two doors may be arranged at opposite sides of the test chamber. In this case, one device under test may be removed from the test chamber through one door, and another device under test may be fed into the test chamber through the other door. In this way, a successive testing of multiple devices under test can be accelerated, since removing of a device under test and feeding another device under test can be performed simultaneously. For example, a conveyor belt may be used for moving the device under test through one door into the test chamber and successively removing the device under test through the other door of the test chamber.

In a possible embodiment, the test system may comprise a number of antennas or power sensors. The antennas or power sensors may be mounted on the ceiling or the side walls of the test chamber. The antennas or power sensors may be adapted to receive radio frequency signals in the test chamber. The number of one or more power sensors or antennas may be located at predetermined positions within the test chamber. In particular, the antennas or power sensors may be mounted on the ceiling and/or the side walls of the test chamber. The antennas or power sensors may be used for measuring radio frequency signals and evaluating the received signals or at least the power of the received signals. In this way, it may be possible to detect interfering or jamming sources which may disturb the measurement of the device under test. Furthermore, it may be also possible to detect beam steering or to measure any other parameters of the radio frequency environment within the test chamber. For example, it may be possible to measure a throughput of a multiple input multiple output (MIMO) arrangement, or to perform a further communication with the device under test, for instance, a wireless link between the device under test and another communication device.

In a possible embodiment, the reflector of the test system may comprise a lightweight material. For example, the reflector may be made by carbon composite or another lightweight material such as aluminum or the like. In this way, the weight of the reflector mounted on the ceiling of the test chamber can be reduced and thus, the stress of the ceiling of the test chamber can be minimized.

With the test system according to the present invention, it is possible to provide a configuration for testing a device under test which enables an efficient testing of the device under test under predetermined conditions. In this way, the quality of the measurement can be increased. Furthermore, the time period for arranging a device under test in the test system can be reduced and therefore, the throughput of testing multiple devices under test can be enhanced.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
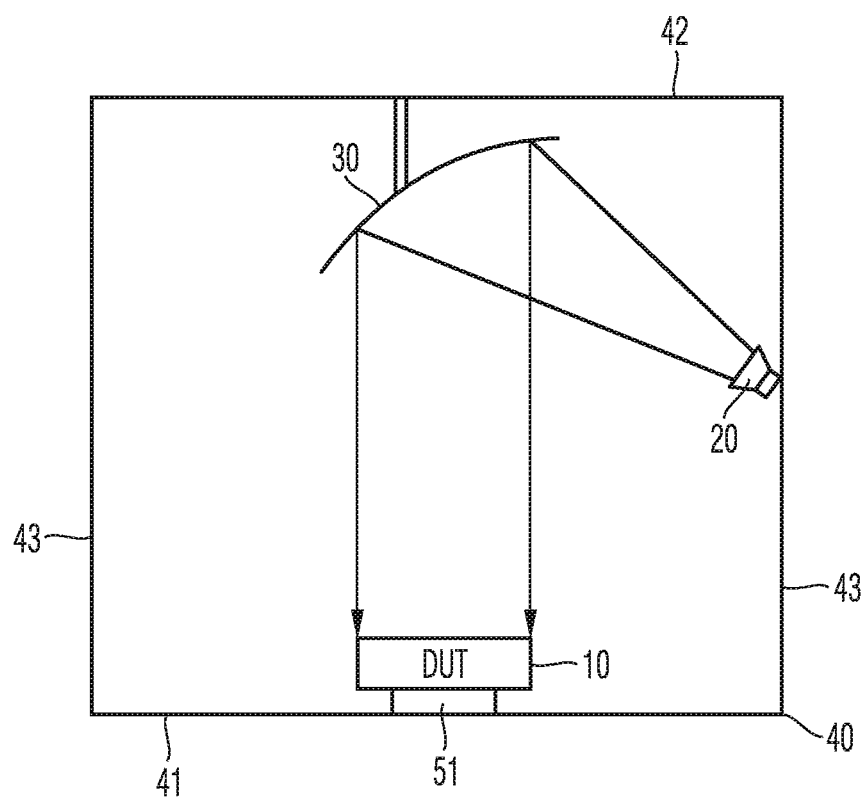
FIG. 1 shows a block diagram of an embodiment of a test system according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

FIG. 1 shows a block diagram of an embodiment of a test system 100. The test system 100 comprises a measurement antenna 20 and a reflector 30. The test system may be arranged in a test chamber 40 comprising a bottom 41, a ceiling 42 and a number of side walls 43. In this configuration, the measurement antenna 20 may be mounted on the bottom 41 of the test chamber 40. However, it is understood, that the test antenna 20 may be also mounted at another position, for instance on a side wall 43 of the test chamber 40.

A device under test 10 may be arranged on the bottom 41 of the test chamber 40. The measurement antenna 20 may emit outgoing test signals to the device under test 10. For this purpose, the test signals are not directly emitted in the direction of the device under test 10. Moreover, the measurement antenna 20 emits the outgoing test signals in the direction of reflector 30, and the reflector 30 reflects the outgoing test signals in the direction of the device under test 10. Accordingly, a size of the reflector 30 may be larger than a beam width of the measurement antenna 20. Furthermore, the reflector 30 may have a configuration which reflects the outgoing test signals from the measurement antenna 20 in the direction of the device under test 10 wherein the outgoing test signals are collimated, such that the radio waves of the radio frequency signals from the reflector 30 to the device under test 10 run parallel to each other. In this way, an almost homogenous radiation of the device under test can be achieved.

Accordingly, the measurement antenna 20 may receive incoming test signals emitted by the device under test 10. Accordingly, the test signals emitted by the device under test 10 are emitted in a direction of reflector 30 and reflector 30 reflects the signals in a direction of measurement antenna 20. For this purpose, the shape of reflector 30 is formed in such a way that the signals from the device under test 10 are focused in the direction of measurement antenna 20.

For focusing the incoming signals the direction of the measurement antenna 20 and collimating the outgoing test signals to the device under test 10, the reflector 30 may have a curved shape. For example, the reflector 30 may have a spherical or parabolic reflecting surface. However, it is understood, that depending on the respective constraints, any appropriate surface for reflecting the incoming and outgoing test signals may be possible.

Since the device under test 10 is located at the bottom 41 of the test chamber 40, and the reflector 30 is mounted on the ceiling 42 of the test chamber 40, the signal path between the device under test 10 and the reflector 30 has a vertical direction. In particular, the signal path from the reflector 30 in the direction of the device under test 10 on the bottom 41 of the test chamber 40 is orthogonal to the bottom 41 of the test chamber 40. In this way, the radiation from the measurement antenna 20 which is reflected by reflector 30 has a well-defined direction to the device under test 10.

In order to adapt the position of the device under test 10 on the bottom 41 of the test chamber 40, a positioning device 51 may be arranged on the bottom 41 of the test chamber 40. The positioning device 51 may have a fixing element for holding the device under test 10. Furthermore, the positioning device 51 may have a number of one or more moving elements for moving the device under test 10 in a longitudinal direction. For example, the positioning device 51 may move the device under test 10 in a direction parallel to the bottom 41 of the test chamber 40. Furthermore, it may be also possible that the positioning device 51 may move the device under test 10 in multiple directions. For example, the device under test 10 may be moved along a first axis parallel to the bottom 41 and along another axis orthogonal to the first axis and parallel to the bottom 41 of the test chamber 40. Furthermore, the positioning device 51 may also move the device under test along another axis orthogonal to the bottom 41 of the test chamber 40. The positioning device 51 may also rotate the device under test 10 along one or more axis. However, it is understood, that any further movement of the device under test 10 may be also possible.

Figure 2:
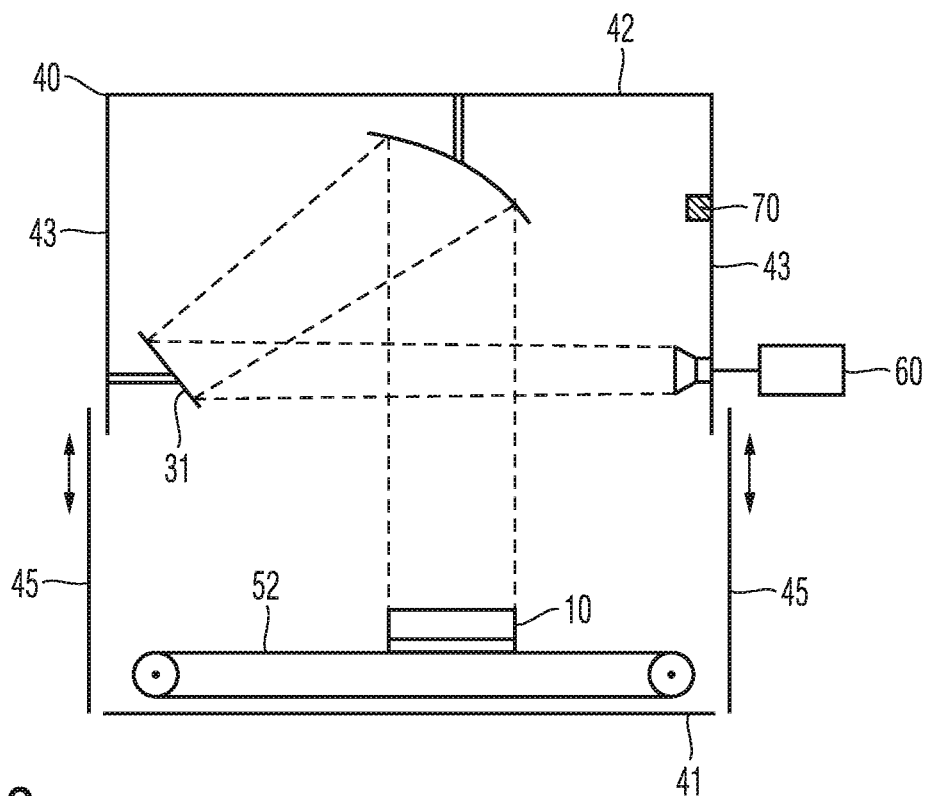
FIG. 2 shows a block diagram of another embodiment of a test system according to the present invention.

FIG. 2 shows a block diagram of another embodiment of a test system 100. The test system 100 according to FIG. 2 mainly corresponds to the previously described test system according to FIG. 1.

The test chamber 40 in FIG. 2 comprises a number of one or more closeable doors 45. The closeable doors 45 can be opened for feeding a device under test 10 into the test chamber 40. Further, the device under test 10 may be removed from the test chamber 40 through one of the closeable doors 45. For example, the test chamber 40 may comprise one closeable door 45 for feeding a device under test 10 and removing a device under test 10 after the measurement procedure has been finished. Furthermore, it may be also possible that one door 45 may be used for feeding the device under test 10 into the test chamber 40 and another door 45 may be used for removing the device under test 10 after the test procedure has been finished. The doors 45 may be opened for feeding the device under test 10 into the test chamber and removing the device under test 10 from the test chamber. Furthermore, the closeable doors 45 may be closed during the device under test 10 is measured.

Furthermore, the test system 100 may comprise a feeding device, such as a conveyor belt 52. For example, a device under test 10 may be placed on the conveyor belt 52 and moved into the test chamber 40. After the test of the device under test 10 has been finished, the device under test 10 may be moved further for removing the device under test 10 from the test chamber 40. However, it is understood, that any other feeding device for moving the device under test 10 into the test chamber 40 and/or removing the device under test 10 from the test chamber 40 may be also possible.

As illustrated in FIG. 2, the test system may comprise a signal generator and/or analyzer 60. For example, a signal generator 60 may generate radio frequency signals. The generated radio frequency signals may be provided to the measurement antenna 20. Accordingly, measurement antenna 20 may emit outgoing test signals corresponding to the generated test signals generated by the test generator 60. Alternatively or additionally, measurement antenna 20 may receive incoming test signals and forward the received test signals to an analyzer 60 for a further analysis of the incoming test signals. It is understood, that the test generator and the analyzer 60 may be combined into a single device for generating test signals and analyzing the received test signals.

Furthermore, the test system may comprise a number of one or more further antennas or power sensors 70. The further antennas or power sensors 70 may be mounted on any appropriate position inside the test chamber 40. For example, the antennas or power sensors 70 may be mounted on a side wall 43, the ceiling 42 or the bottom 41 of the test chamber. The further antennas or power sensors 70 may receive radio frequency signals. In particular, the further antennas or power sensors 70 may receive signals which can be used for detecting interferences, disturbances, etc. Furthermore, the further antennas or power sensors 70 may be used for analyzing a throughput of a MIMO system, or for a communication link between the device under test and a control device (not shown).

As can be further seen in FIG. 2, the test system may further comprise a number of one or more further reflectors 31. The further reflectors may be mounted, for instance, on a side wall 43 of the test chamber 40. However, it is understood, that any other position for mounting the further reflectors 31 may be also possible. In particular, the further reflectors 31 may be located in a signal path between the device under test and the measurement antenna 20. In particular, the further reflectors 31 may be arranged in the signal path between the measurement antenna 20 and the reflector 30.

Furthermore, it may be also possible, that the direction for emitting and receiving radio frequency signals of the measurement antenna 20 may be changed. For example, the orientation of the measurement antenna 20 may be changed. For this purpose, the measurement antenna 20 may be arranged on a positioning device (not shown). Accordingly, measurement antenna 20 may emit signals in a direction different from the direction of the reflector 30 or measurement antenna 20 may receive signals from a direction different from the direction of the reflector 30. For example, a direct signal path between the device under test 10 and the measurement antenna 20 may be established.

For sake of clarity in the following description of the method based on FIG. 3, the reference signs used in the above description of FIGS. 1 and 2 will be maintained.

Figure 3:
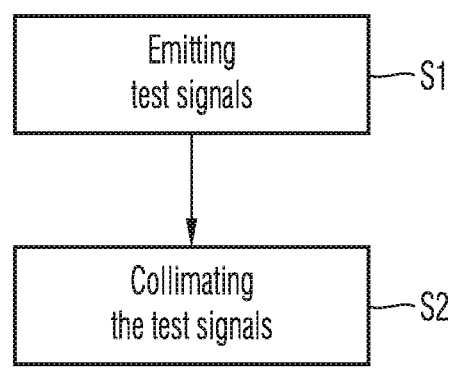
FIG. 3 shows a flow diagram of an embodiment of a test method according to the present invention.

FIG. 3 shows a flow diagram of a test method for wirelessly testing a device under test 10.

The test method may be applied for testing a device under test 10 on a bottom 41 of a test chamber 40. The test method comprises emitting S1 outgoing test signals to the device under test 10 or receiving incoming test signals emitted by the device under test 10 by a measurement antenna 20 mounted on the bottom 41 or on a side wall 43 of the test chamber 40. The test method further comprises collimating S2 the test signals emitted by the measurement antenna 20 in a direction of the device under test 10 or focusing the test signals emitted by the device under test 10 in a direction of the measurement antenna 20 by a reflector 30 mounted on a ceiling 42 of the test chamber 40.

A signal path of the outgoing test signals and the incoming test signals between the device under test 10 and the reflector 30 may be in a vertical direction of the test chamber 40.

The signal path of the outgoing test signals and the incoming test signals between the device under test 10 and the reflector 30 may be orthogonal to the bottom 41 of the test chamber 40.

The test method may comprise a step of positioning the device under test 10 at a predetermined position in the test chamber 40 by a positioning device 51.

The test method may comprise feeding the device under test 10 into the test chamber 40 by a conveyor belt 52.

The test method may be performed in a shielded test chamber 40 having a ceiling 42, a bottom 41 and a number of side walls 43.

The test method may comprise feeding the device under test 10 into the test chamber 40 through a closeable door 45 of the test chamber 40.

The test method may further comprise receiving radio frequency signals in the test chamber 40 by a number of antennas or power sensors 70 mounted on the ceiling 42 or the side walls 43 of the test chamber 40.

The reflectors may comprise a lightweight material. In particular, the reflectors may be formed based on a carbon composite or another lightweight material such as aluminum.

The test method may further comprise reflecting the incoming signals and the outgoing signals by a number of further reflectors 31 located in the signal path between the reflector 30 and the measurement antenna 20.

Summarizing, the present invention relates to a test system for testing a wireless device under test in a test chamber. The device under test may be located on a bottom of the test chamber, and a measurement antenna may be mounted on a bottom or a side wall of the test chamber. Further, a reflector may be mounted on a ceiling of the test chamber. Accordingly, a signal path for testing the device under test may be established by reflecting the wireless signals between the device under test and the measurement antenna by the reflector.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A test system for testing a device under test on a bottom of a test chamber, the test system comprising:
 a measurement antenna mounted on the bottom or on a side wall of the test chamber, the measurement antenna is adapted to emit outgoing test signals to the device under test and receive incoming test signals emitted by the device under test; and
 a reflector mounted on a ceiling of the test chamber, the reflector is adapted to collimate the test signals emitted by the measurement antenna in a direction of the device under test such that homogenous radiation of the device under test is achieved, and to focus the test signals emitted by the device under test in a direction of the measurement antenna,
 wherein radio frequency waves between the device under test and the reflector run parallel to each other and the side walls of the test chamber are not covered by the test signals,
 the reflector focuses the radio frequency waves emitted by the device under test on the measurement antenna, and
 wherein a signal path of the outgoing test signals and the incoming test signals between the device under test and the reflector is in a vertical direction.

2. The test system according to claim 1, wherein the signal path of the outgoing test signals and the incoming test signals between the device under test and the reflector is orthogonal to the bottom of the test chamber.

3. The test system according to claim 1, comprising a positioning device for positioning the device under test at a predetermined position in the test chamber.

4. The test system according to claim 1, comprising a conveyor belt for feeding the device under test into the test chamber.

5. The test system according to claim 1, comprising a shielded test chamber having a ceiling, a bottom and a number of side walls.

6. The test system according to claim 5, wherein the test chamber comprises a number of closeable doors for feeding the device under test into the test chamber.

7. The test system according to claim 1, comprising a number of antennas or power sensors mounted on the ceiling or the side walls of the test chamber, the antennas or power sensors are adapted to receive radio frequency signals in the test chamber.

8. The test system according to claim 1, wherein the reflector comprises a lightweight material, in particular carbon composite.

9. The test system according to claim 1, comprising a number of further reflectors being located in the signal path between the reflector and the measurement antenna.

10. A test method for testing a device under test on a bottom of a test chamber, the test method comprising:
 emitting outgoing test signals to the device under test or receiving incoming test signals emitted by the device under test by a measurement antenna mounted on the bottom or on a side wall of the test chamber; and
 collimating the test signals emitted by the measurement antenna in a direction of the device under test such that homogenous radiation of the device under test is achieved or focusing the test signals emitted by the device under test in a direction of the measurement antenna by a reflector mounted on a ceiling of the test chamber,
 wherein radio frequency waves between the device under test and the reflector run parallel to each other and the side walls of the test chamber are not covered by the test signals,
 the radio frequency waves emitted by the device under test are focused on the measurement antenna, and
 wherein a signal path of the outgoing test signals and the incoming test signals between the device under test and the reflector is in a vertical direction.

11. The test method according to claim 10, wherein the signal path of the outgoing test signals and the incoming test signals between the device under test and the reflector is orthogonal to the bottom of the test chamber.

12. The test method according to claim 10, comprising positioning the device under test at a predetermined position in the test chamber by a positioning device.

13. The test method according to claim 10, comprising feeding the device under test into the test chamber by a conveyor belt.

14. The test method according to claim 10, wherein the test method is performed in a shielded test chamber having a ceiling, a bottom and a number of side walls.

15. The test method according to claim 14, comprising feeding the device under test into the test chamber through a closeable door of the test chamber.

16. The test method according to claim 10, comprising receiving radio frequency signals in the test chamber by a number of antennas or power sensors mounted on the ceiling or the side walls of the test chamber.

17. The test method according to claim 10, wherein the reflector comprises a lightweight material, in particular carbon composite.

18. The test method according to claim 10, comprising reflecting the incoming signals and the outgoing signals by a number of further reflectors located in the signal path between the reflector and the measurement antenna.

* * * * *